July 3, 1934.  C. L. GREER  1,965,036
TROLLEY WIRE SUSPENDING MEANS
Filed May 31, 1929  2 Sheets-Sheet 1

Inventor
Commodore L. Greer
By Hardway & Cathey
Attorneys

July 3, 1934. C. L. GREER 1,965,036
TROLLEY WIRE SUSPENDING MEANS
Filed May 31, 1929 2 Sheets-Sheet 2
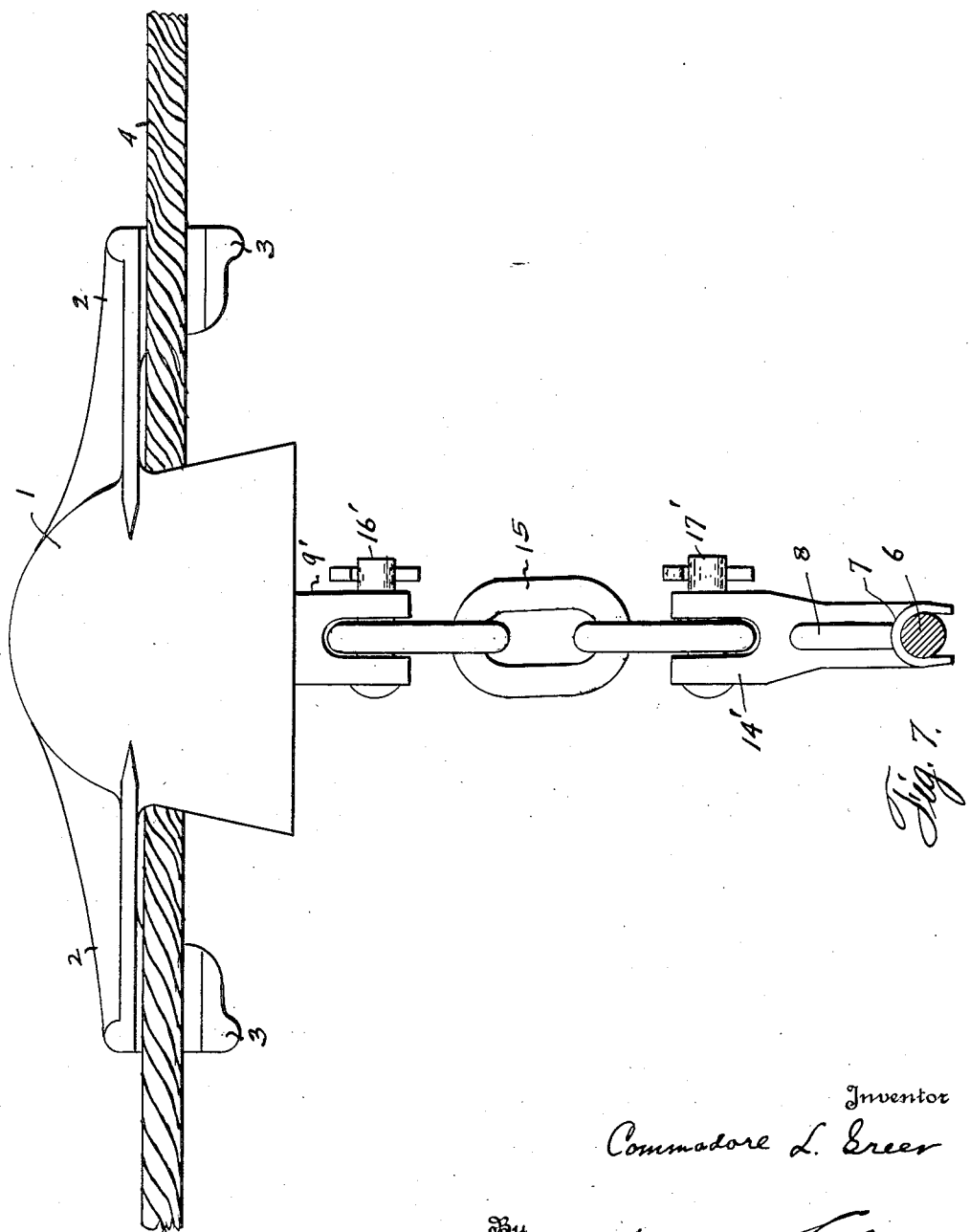

Patented July 3, 1934

1,965,036

UNITED STATES PATENT OFFICE

1,965,036

TROLLEY WIRE SUSPENDING MEANS

Commodore L. Greer, League City, Tex.

Application May 31, 1929, Serial No. 367,442

1 Claim. (Cl. 191—40)

This invention relates to new and useful improvements in trolley wire suspending means.

One object of the invention is to provide novel means for suspending a trolley wire from a span wire which will permit the lateral swinging of said trolley wire for the purpose hereinafter set out. At the present time the trolley wire of an electric street railway system is suspended from span wires which extend transversely across and above and at right angles to the track. The trolley wire is suspended from the span wire by means of a hanger substantially rigidly connected to the span wire and an ear rigidly connected to the hanger and which is clamped around the trolley wire. The span wires, and consequently the suspension points of the trolley wire, are placed a considerable distance apart thus permitting the trolley wire to sway from side to side between the suspension points. Vibrations are thus set up in the trolley wire when the current collector passes along said wire, said vibrations being considerably increased by the lurching of the car for any reason, such as rough handling of the car by the motorman or rough track over which the car is passing. Inasmuch as the trolley engaging ear is rigidly connected to the hanger and the hanger is substantially rigidly connected to the span wire the trolley wire can not sway or swing at the suspension points with the result that the vibrations set up in the trolley wire between the points of suspension are terminated at the points where the trolley wire enters the ends of the ears and this concentration of the vibration at a single point of the trolley wire soon causes the wire to break at the ends of the ears supporting said trolley wire. The chief object of this invention is to provide a flexible suspending means which will permit the vibrations of the trolley wire to pass the points of suspension, and gradually fade out ahead of and behind the current collector.

In street car systems where double tracks are used it is customary to suspend a trolley wire above each track both wires being suspended from a single span wire at opposite points, said span wires crossing both tracks at right angles to same. With the method of suspension in common use the trolley wires suspended in such manner do not hang in the vertical plane with respect to the point of suspension but due to the elevation of one side of the hanger above the other side, the trolley wire hangs in a position which is offset from a vertical line which passes through the center point of suspension, which causes one side of the ear to be worn away by the current collector faster than the other side, thereby causing the ear to be worn out sooner than if both sides of the ear were exposed to the same amount of wear.

Another object of the invention is to provide a suspending means by the use of which the trolley wire suspended will hang directly vertical with respect to the point of suspension, and in a vertical plane so that the trolley wire ear will be worn equally on each side by the current collector.

With the above and other objects in view this invention has particular relation to certain novel features of construction, arrangement of parts and use, an example of which is given in this specification and illustrated in the accompanying drawings wherein:

Figure 7 shows an end elevation of the novel type of suspended means herein described and claimed.

Figure 1:
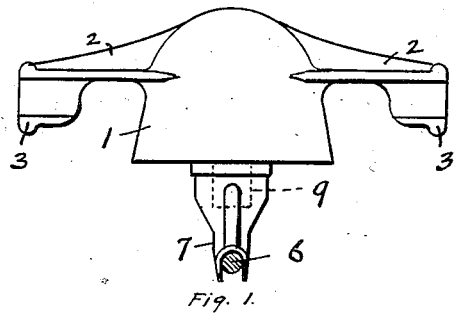
Figure 1 shows an end view of a conventional type of span wire bracket and trolley ear assembled as now commonly used.
Figure 2:
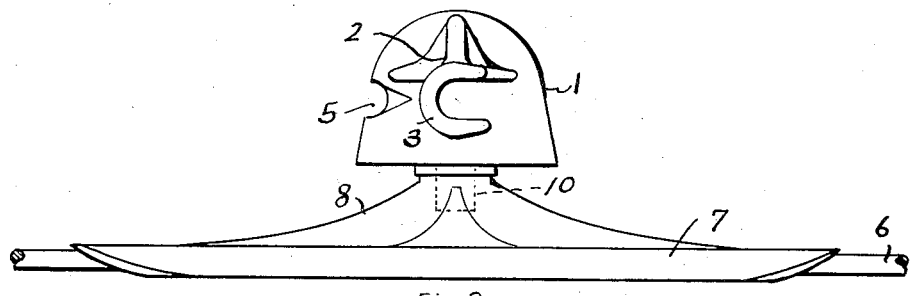
Figure 2 shows a side view thereof.

Referring now more particularly to the drawings, wherein like numerals of reference designate similar parts in each of the figures, the numeral 1 designates a conventional type of hanger having lateral arms 2, 2, terminating in end hooks 3, 3. The span wire 4 is engaged by said hooks 3 and said wire passes around the hanger and is seated in the groove 5, extending transversely across the hanger behind said hooks. The span wire extends across and above the trolley wire 6 and is attached to suitable anchor posts on opposite sides of the track. The hanger 1 is thus held substantially in rigid position.

The numeral 7 designates the trolley ear which is an elongated piece of material having a groove in its underside to receive the trolley wire 6 and the metal of the ear may be riveted or bent around underneath the trolley wire to hold the wire in said groove. The ear 7 has an upstanding longitudinal web 8. Depending from the hanger there is an externally threaded stud 9 which is threaded into an internally threaded socket 10 in the top of the trolley ear.

With the construction hereinabove described, the trolley ear 7 will be rigidly anchored to the hanger. This is the conventional type of trolley wire suspending means now in common use, and the invention herein consists in certain improvements thereon, presently to be described.

The numeral 11 designates a socket member and 12 designates a pin member. These members are formed with the respective clevises 13, 14 and are connected by a suitable flexible connecting member 15 having end links inserted in the said clevises and retained therein by means of the respective clevis pins 16, 17. In order to incorporate this flexible connection shown in Figures 3 and 4 into the conventional suspending means, the hanger and ear are unscrewed and separated and the stud 9 then screwed into the socket member 11, and the pin 12 is screwed into the ear socket 10.

Figures 3, 4:
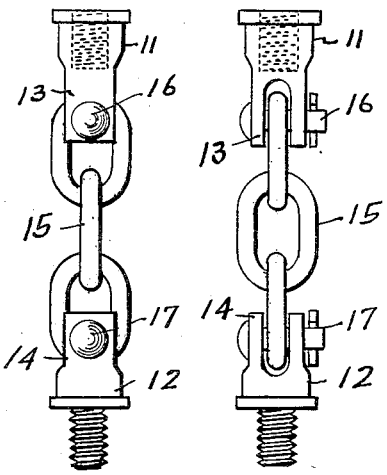
Figures 3 and 4 show views taken at right angles to each other, of flexible means adapted to be interposed between and connected to the conventional type of bracket and trolley ear now commonly used.

The conventional type of trolley wire suspending means may be used, without modification, in combination with the flexible connecting means shown in Figures 3 and 4.

Figure 5:
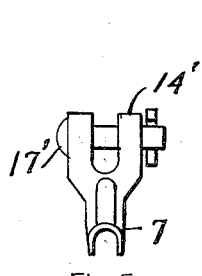
Figure 5 shows a modified form of trolley ear.
Figure 6:
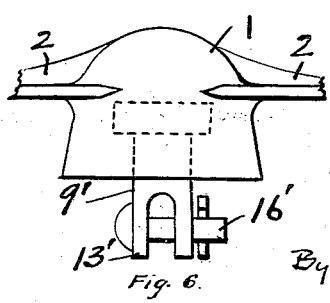
Figure 6 shows a modified form of suspending bracket.

In Figures 5 and 6 the depending stud 9' is formed into a clevis 13' having the clevis pin 16' and the trolley wire ear is shown provided with a clevis 14' having the clevis pin 17'. In this form of construction the ear 7 may be suspended by means of the flexible connection 15 whose upper link is engaged by the clevis pin 16' and whose lower link is engaged by the clevis pin 17'. This construction is also shown in Figure 7.

It is obvious that the trolley wire 6 will be suspended from the various span wires 4 by means of flexible suspending means which will permit the trolley wire to sway or swing laterally relative to the car tracks, that is lengthwise relative to the span wires, and this will permit the vibrations imparted to the trolley wire from the current collector to pass the points of suspension and gradually fade out ahead of and behind the current collector and will thus prevent the concentration of the vibration at the ends of the trolley wire ears.

What I claim is:

The combination with a span wire having a hanger provided with end hooks for detachably securing the hanger to said wire, of a trolley wire beneath and extending substantially at right angles to said span wire and having an ear attached thereto, a chain forming a flexible suspending member connecting said hanger to said ear whereby the trolley wire may swing freely, laterally, the connections between said suspending member and the ear and hanger, respectively, each being characterized by the provision of a clevis on one of said respective connected parts and a link carried by the other connected part through which the pin of the connecting clevis extends.

COMMODORE L. GREER.